# 3,460,905
PREPARATION OF PENTABORANE(9)

Lawrence J. Edwards, Zelienople, and William V. Hough, Gibsonia, Pa., assignors to Mine Safety Appliances Company, a corporation of Pennsylvania
No Drawing. Original application July 18, 1957, Ser. No. 672,573, now Patent No. 3,281,218, dated Oct. 25, 1966. Divided and this application Aug. 1, 1966, Ser. No. 569,083
Int. Cl. C01b 35/00
U.S. Cl. 23—204                 32 Claims This application is a division of Ser. No. 672,573 filed July 18, 1957, which has issued as U.S. Patent No. 3,281,218.

This invention relates to boranes, and more particularly this invention relates to novel coordination compounds of boranes, methods of making these coordination compounds, and methods of making pentaborane(9), $B_5H_9$.

Pentaborane(9) has received considerable attention in recent years as a reducing agent and as an accelerator for the vulcanization of natural and synthetic rubbers. Furthermore, a number of recent publications have shown that pentaborane(9) is a suitable high energy fuel for use in rocket and jet engines. Its usefulness is enhanced by the fact that it is a stable liquid at ordinary temperatures and pressures.

Heretofore the most practical method of preparing pentaborane(9) was by the pyrolysis of diborane. Various investigators have attempted to increase the proportion of pentaborane(9) in the mixture of pyrolysis products by varying the conditions at which the pyrolysis was performed. The attempts have been only moderately successful because when the conditions are sufficiently severe to form pentaborane(9), the pentaborane(9) itself is consumed by various pyrolytic side reactions and to avoid this the pentaborane(9) must be removed rapidly from the pyrolysis zone. Under such conditions only a very small proportion of the diborane is converted even though the yield of pentaborane(9) based on the amount of diborane consumed by pyrolysis is relatively high. It has become evident that a more convenient method for producing pentaborane(9) in acceptable amounts and yields is required if this compound is to receive the potential of uses to which it is entitled.

It is among the objects of this invention to provide a new and useful method of preparing pentaborane(9) in quantitative yields by a non-pyrolytic reaction.

Another object is to provide a new and useful method of preparing pentaborane(9) by the reaction of tetraborane and an adduct of triborane(7).

Yet another object is to provide a method of preparing pentaborane(9) by pyrolysis of diborane in the presence of an organic substituted hydride of group V-A and VI-A elements, an adduct of triborane(7) and an organic substituted hydride of group V-A and VI-A elements, an adduct of borane, $BH_3$, and an organic substituted hydride of group V-A and VI-A elements and mixtures thereof.

A further object is to provide new and useful addition compounds of triborane(7) and an organic substituted hydride of group V-A and VI-A elements and hydrides of group V-A elements.

Another object is to provide a new and useful method of preparing these new triborane(7) adducts by the reaction of tetraborane and an organic substituted hydride of group V-A and VI-A elements, and the reaction of tetraborane with the borane adducts of an organic substituted hydride of group V-A and VI-A elements.

This invention is based on the discovery that tetraborane reacts with certain coordinating compounds, X, to form a coordination compound, or complex $XB_3H_7$, which may be considered a triborane(7) addition compound or adduct. This triborane(7) adduct may react further under suitable conditions with tetraborane to quantitatively yield pentaborane(9). It has also been discovered that when diborane is pyrolyzed under suitable conditions in the presence of such coordinating compound, X, adducts of triborane(7), $XB_3H_7$, adducts of borane, $XBH_3$, or mixtures thereof the pyrolysis products contain an exceptionally high proportion of pentaborane (9), and an exceptionally low amount of solid $BH_x$ polymers. We have discovered that coordinating compounds which function in this invention are those compounds which can be considered as organic substituted hydrides of group V-A and VI-A elements which are basic in character, that is, compounds in which the group V-A and VI-A element is capable of donating an electron pair. Amines, ethers, thioethers, phosphines, and arsines are included in this classification.

This invention is more fully described hereinafter and and the novelty thereof will be particularly pointed out and distinctly claimed.

According to this invention pentaborane(9) is produced from tetraborane and a coordinating compound by a two step reaction. A triborane(7) adduct is first produced according to Equation 1

(1) 

The triborane(7) adduct reacts with additional tetraborane to give 2 mols of pentaborane(9) for each additional 4 mols of tetraborane; this step may be represented by Equation 2

(2) 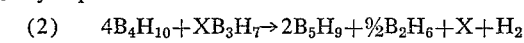

In the overall process, then, 2 mols of pentaborane(9) are produced for each 5 mols of tetraborane consumed. A mixture of the reactants and products of either reaction (1) or (2) contains the reactants of the other reaction, so that both reactions may proceed simultaneously.

The rate at which reaction (1) proceeds in the forward direction appears to be determined by the base strength of the coordinating reactant. For example, with strong bases the reactions goes instantly to completion, while with very weak bases the reaction is very slow and there is a low equilibrium concentration of the triborane(7) adduct. Reaction (2) proceeds at a relatively slow rate and does not appear to be reversible to any significant extent. The rate is dependent in the usual manner on reactant concentration and on the strength of the base component of the triborane(7) adduct, it appears that the stronger the base the slower the rate of reaction. The base strength of the coordinating compound or other terms connoting basicity as used herein are relative terms in accord with common usage. It refers to its capability to coordinate with $B_3H_7$ and it is believed that it is affected both by intramolecular electronic effects and steric effects caused by molecular structures. There is a continuous spectrum of base strength from very strong to very weak in this group of organic substituted hydrides of elements of group V-A and VI-A, and the process variations caused by variation in base strength are for convenience hereinafter discussed in terms of an arbitrary division into very strong, strong, weak, and very weak base strength.

The reactions of strong bases, e.g. tetrahydrofuran, with tetraborane clearly show the two step reaction to form pentaborane (9). Tetraborane and tetrahydrofuran react rapidly to form tetrahydrofuran triborane (7) and diborane. Tetraborane (6.48 millimoles) and tetrahydrofuran (6.58 millimoles) were frozen in a reaction bulb connected to a vacuum system. The reaction bulb was allowed to warm and when the products became fluid an immediate and vigorous reaction occurred from which diborane was evolved. The diborane evolution appeared to stop in about five minutes indicating the completion of the reaction. The product was a viscous, colorless liquid at room temperature and was found to be a mixture of tetrahydrofuran triborane (7), $C_4H_8OB_3H_7$, and absorbed diborane. The absorbed diborane was removed from this product by subjecting the mixture to a vacuum at room temperature. The residue remaining in the flask was a white solid, containing 3 milliatoms of boron and 6.98 milliatoms of hydrogen for each 1.01 millimoles of tetrahydrofuran as compared to the theoretical 3 milliatoms of boron and 7 milliatoms of hydrogen for each millimole of tetrahydrofuran for the pure compound, tetrahydrofuran triborane (7). The reaction of tetraborane with tetrahydrofuran triborane (7) (to produce pentaborane (9)) is quite slow. For example, when 6.7 millimoles of tetraborane were contacted with 1.99 millimoles of tetrahydrofuran triborane (7) at room temperature for a period of 5 hours it was found that 43% of the tetraborane had reacted. For each 2½ moles of tetraborane consumed 0.98 mole of pentaborane (9) was produced. The amount of tetrahydrofuran triborane (7) recovered was equal to the amount charged. As the tetrahydrofuran triborane (7) is regenerated as fast as it is consumed the overall reaction may be regarded as catalyzed by the triborane (7) adduct:

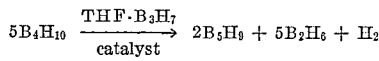
$$5B_4H_{10} \xrightarrow[\text{catalyst}]{THF \cdot B_3H_7} 2B_5H_9 + 5B_2H_6 + H_2$$

The catalyst, of course, does not have to be separately prepared and isolated, but can be formed in situ from tetrahydrofuran and tetraborane. Thus when 9.10 mmoles of tetraborane and 0.66 mmole of tetrahydrofuran were frozen into a reaction bulb, warmed to room temperature, and maintained at room temperature for a period of 5 hours, 2.41 mmoles of tetraborane were consumed. Of this, 0.62 mmole were consumed to form tetrahydrofuran triborane, and 1.75 mmoles were consumed by the reaction forming pentaborane (9). A quantitative yield of pentaborane (9) was recovered by fractional distillation under vacuum from the reaction mixture. The recovery of tetrahydrofuran triborane(7) was about 95%. If the reactants are left in contact for longer periods, a higher proportion of the tetraborane reacts. Thus, when 9.02 millimoles of tetraborane were reacted with .66 millimole of tetrahydrofuran in the same manner for a period of 16 hours, 5.33 millimoles of the tetraborane were consumed by the reaction (4.67 mmoles consumed in pentaborane(9) forming reaction). The yields of pentaborane(9) and tetrahydrofuran triborane(7) were over 95% based on Equations 1 and 2.

The reactions of strong bases with tetraborane are characterized by the formation of relatively stable triborane(7) adducts. The rate at which the triborane(7) adduct forms from tetraborane and the strong base is several orders of magnitude greater than the rate at which the triborane(7) adduct reacts with tetraborane to give pentaborane(9).

Tetraborane reacts with weak bases to form a triborane(7) adduct at a rate much slower than with strong bases. The group of weak bases is characterized by a substantial equilibrium concentration of triborane(7) adduct; i.e., when the rate of formation of the triborane(7) adduct by reaction (1) is substantially equal to the rate the triborane(7) adduct is consumed by reaction (2) there is an equilibrium mixture of the base and substantial amount of triborane(7) adduct. The actual equilibrium concentration can be adjusted to a certain extent by the diborane and tetraborane concentrations, but is primarily a function of the basicity of the base. The triborane(7) adducts with weak bases are normally liquids at room temperature and are relatively unstable.

The following examples of the reactions of ethyl ether illustrate the weak base reactions. Tetraborane (9.50 millimoles) and ethyl ether (14.50 millimoles) were frozen into a reaction bulb attached to a vacuum system. After 5 hours contact at room temperature 4.04 mmoles of tetraborane had been consumed. The gaseous products, hydrogen and diborane, were removed, leaving a liquid mixture of pentaborane(9), ethyl ether, ethyl ether triborane(7), and some absorbed diborane. This mixture was fractionated under vacuum at low temperature (about 10° C.); ethyl ether and 1.56 mmoles of pentaborane(9) were removed and 0.85 mmole of ethyl ether triborane(7) residue remained in the bulb. The ethyl ether triborane(7) adduct is the least volatile component in the mixture, exerting a pressure of 3 mm. at 0° C., and is a liquid at room temperature. The compound is relatively unstable at room temperature; it almost completely decomposes over a period of several days. The product contained about 1.02 millimoles of ether to 3 milliatoms of boron to 7.02 milliatoms of hydrogen compared to theoretical ratio of 1:3:7. In another reaction 6.98 mmoles of tetraborane and 15 mmoles of ethyl ether were contacted in the same manner for a period of 6 hours. 49% (3.43 mmoles) of the charged tetraborane was consumed, yielding 1.08 mmoles of pentaborane(9) and 0.70 mmole of ethyl ether triborane(7). With longer reaction periods more tetraborane is consumed to produce pentaborane(9); however, the concentration of ethyl ether triborane(7) does not appear to increase. Since the equilibrium amount of triborane(7) adduct is continually regenerated the overall reaction may be regarded as catalyzed by the mixture:

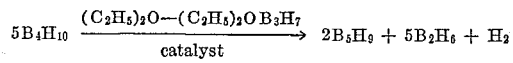
$$5B_4H_{10} \xrightarrow[\text{catalyst}]{(C_2H_5)_2O-(C_2H_5)_2OB_3H_7} 2B_5H_9 + 5B_2H_6 + H_2$$

The reaction of very weak bases with tetraborane to form the triborane(7) adduct is even slower than with weak bases, thus the equilibrium concentration of the triborane(7) adduct is very low, i.e. a trace amount. For example, when 2.45 mmoles of tetraborane were contacted with 2.52 mmoles of diphenylmethylamine for 40 hours at room temperature 1.75 mmoles of tetraborane was consumed. A 95% yield of pentaborane(9) based on equations (1) and (2) was recovered. The triborane(7) adduct could not be found by usual chemical analyses, but the presence of trace amounts was indicated by infrared spectrum analyses. Inasmuch as the equilibrium amount of triborane adduct is only a trace amount the overall reaction may be considered as being catalyzed by the base:

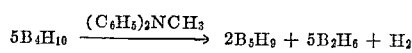
$$5B_4H_{10} \xrightarrow{(C_6H_5)_2NCH_3} 2B_5H_9 + 5B_2H_6 + H_2$$

The reactions of tetraborane with very strong bases is complicated in that the by-product diborane reacts with the base to form a borane adduct,

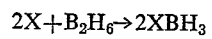
$$2X + B_2H_6 \rightarrow 2XBH_3$$

which results in the overall reaction (3) 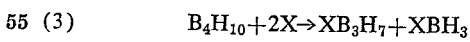
$$B_4H_{10} + 2X \rightarrow XB_3H_7 + XBH_3$$

Tetraborane reacts also with the borane adduct to form additional triborane adduct according to (4) 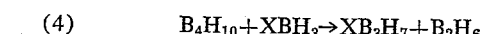
$$B_4H_{10} + XBH_3 \rightarrow XB_3H_7 + B_2H_6$$

in addition to the pentaborane(9) producing reaction, (5) 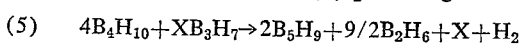
$$4B_4H_{10} + XB_3H_7 \rightarrow 2B_5H_9 + 9/2B_2H_6 + X + H_2$$

Reaction (3), which produces the triborane(7) adduct and the borane adduct, is extremely rapid and proceeds instantaneously even at low temperatures. Reaction (4) is quite slow, but with any given very strong base is more rapid than reaction (5). That is, the concentration of $XB_3H_7$ is higher than the concentration of $XBH_3$ at equilibrium conditions. Thus when tetraborane is contacted with a very strong base, pentaborane(9) is produced and an equilibrium mixture of the triborane(7) adduct and the borane adduct is maintained. As this equilibrium mixture is maintained regardless of the amount of tetraborane consumed by the overall reaction to pentaborane(9), the reaction may be regarded as catalyzed by the mixture according to:

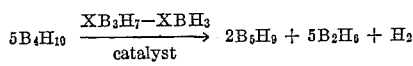

$$5B_4H_{10} \xrightarrow[\text{catalyst}]{XB_3H_7-XBH_3} 2B_5H_9 + 5B_2H_6 + H_2$$

The reactions of tetraborane with very strong bases are hereinafter illustrated by reactions of trimethylamine. Tetraborane, 1.77 mmoles, containing 0.24 mmole diborane impurity, was frozen in a reaction bulb containing 4.00 mmoles of frozen trimethylamine. The reaction bulb was allowed to warm, and as the reactants melted, an immediate vigorous reaction occurred producing an equimolar mixture of crystals of trimethylamine triborane(7) and trimethylamine borane. There were no volatile products formed. The theoretical boron content of the product mixture, taking into account the diborane impurity charged, was 21.17 mat./g. (milligram atoms per gram of sample) the actual boron content was determined to be 21.2 mat./g. Infra-red spectrum analysis showed that the product contained trimethylamine triborane(7).

Tetraborane, 4.56 mmoles, and trimethylamine borane, 3.96 mmoles, were charged into a reaction bulb maintained at room temperature. After ½ hour, about 10% of the tetraborane had reacted. After 40 hours 90% of the tetraborane had reacted, of which 25% was consumed by the reaction producing pentaborane(9). The solid product was approximately 67% trimethylamine triborane(7) and 33% trimethylamine borane. With higher tetraborane concentration the reaction equilibrium is shifted to give larger amounts of triborane(7) adduct.

The trimethylamine triborane(7) may be formed in situ by the reaction of tetraborane and trimethylamine. Thus when 5.06 mmoles of tetraborane was frozen onto 1.03 mmoles of frozen trimethylamine and allowed to warm to room temperature a vigorous reaction occurred producing equimolar amounts o trimethylamine triborane(7) and trimethylamine borane. This mixture was then allowed to stand at room temperature for 48 hours and over 90% of the borane adduct was converted to trimethylamine triborane(7) and about 15% of the tetraborane was consumed to give 0.39 mmole of pentaborane(9). With longer reaction periods, or with addition of more tetraborane, more tetraborane is consumed to form pentaborane(9) with no further change in the equilibrium concentration of triborane(7) adduct.

It has been found that completely organic substituted hydrides of elements from group V-A and VI-A, which are bases, are operable in the invention. The hydrides of group V-A may be only partially substituted; however, only completely substituted hydrides of group VI-A elements are desirable, because the R-X-H type compounds are apt to be involved in undesirable side reactions. The coordination compound (or adduct) with triborane(7) is formed by a coordination bond involving an available electron pair of the group V-A and VI-A element. Thus there is a wide range of base strengths possible as the coordinating electron pair can be made more or less accessible by blocking with large molecular structures, i.e. steric hindrance. For example the amines, phosphines, and arsines range from very strong to very weak bases. Lower alkyl amines (e.g. primary, secondary and tertiary methyl and ethyl amines, propyldimethylamine, butyldimethylamine), and secondary and tertiary cyclic amines (e.g. pyridine, lutidine, picoline, collidine, pyrrolidine, pyrazine and pyrrole) are very strong bases. The phosphorous analogues of these amines, e.g. trimethyl phosphines, are also very strong bases. However, amines or phosphines containing three larger alkyl groups or an aryl group (e.g. phenyldimethylamine or tri-n-propylamine) are weak bases; and amines or phosphines containing two or more aryl groups (e.g. diphenylmethylamine) are very weak bases. Substituted alkyl, aryl, or alkyl aryl amines are operable in the same manner—benzyldimethylamine is a reasonably strong base while dibenzylmethylamine is a very weak base. The base strength of phosphine analogues of the amines is comparable to the base strength of the amines. The base strength of the arsines is less than the corresponding amine analogue.

The ethers and thioethers vary from strong bases to very weak bases. The cyclic ethers (e.g. tetrahydrofuran, furan, tetrahydropyran, chlorofurfuran, tetrahydrofurfurylchloride, dimethylfuran, and diethyl acetal) and dimethl ether are strong bases. Lower alkyl ethers, other than dimethyl ether, (e.g. diethyl ether, di-n-propyl ether, and propyl methyl ether) and lower alkyl aryl ethers (e.g. anisole) are weak bases. Diaryl ethers, such as diphenyl ether are very weak bases. Thioethers are somewhat weaker than the oxygen analogues, for example, thiophene is a weak base while furan is a stronge base.

The reactions proceed as described if the organic substituted groups themselves contain substituted groups provided that the latter substituted group is not reactive in the environment of the reaction. For example, if the organic substituted group contains a carbonyl group, the carbonyl group will react with the tetraborane or diborane.

It is preferred to carry out the reaction to produce pentaborane(9) from tetraborane at or slightly above room temperature, although it proceeds over a wide temperature range. At low temperatures, e.g. 0° C., the pentaborane(9) producing reaction is slow and there is no practical advantage to operating under such conditions. At higher temperatures, e.g. 50–60° C., the tetraborane, present in relatively high concentrations, decomposes to an appreciable extent resulting in low yields of pentaborane(9).

It has been discovered that when diborane is pyrolyzed in the presence of the above described bases there is recovered a higher yield of pentaborane(9) and a lower loss to solid $BH_x$ polymers than when diborane is pyrolyzed alone under the same conditions (of temperature, pressure and time). It is believed that these desirable effects result from the reaction of tetraborane, the early pyrolysis product of diborane, with the base to give a quantitative yield of pentaborane(9). An alternative plausible mechanism is that triborane(7) is an early formed pyrolysis product and reacts directly with the base and tetraborane need not exist per se; this is in conformation with the hypothesis that tetraborane is formed from an initial unstable pyrolysis product, triborane(7). It is known, however, that tetraborane is an early product from the pyrolysis of diborane, and that the other pyrolysis products, including the desirable pentaborane(9) and undesirable $BH_x$ polymers, result from additional pyrolysis reactions involving tetraborane. These pyrolysis reactions occur simultaneously and produce a complete spectrum of higher boranes and solid boron-hydrogen polymers. Heretofore, it has been possible to control the pyrolysis reaction to some extent by varying conditions so that somewhat higher or lower yields of specific higher boranes were obtained.

When diborane is pyrolyzed in the presence of a base as described herein, however, a proportion of the initially produced tetraborane reacts with the base to give quantitative yields of pentaborane(9) according to

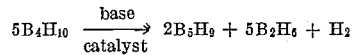

$$5B_4H_{10} \xrightarrow[\text{catalyst}]{\text{base}} 2B_5H_9 + 5B_2H_6 + H_2$$

and only a portion of the tetraborane is consumed by the pyrolysis reactions that give much lower yields of pentaborane(9). Under certain conditions extremely high yields, i.e. about 90%, of pentaborane(9) can be obtained with a relatively high conversion of diborane (20–25%); and at other conditions essentially all the diborane can be converted with at least 60–70% yields of pentaborane(9). Furthermore, when diborane is pyrolyzed under suitable conditions in the presence of the base the yield of pentaborane(9) is increased over that obtained from pyrolysis in the absence of the base as some portion of the tetraborane reacts to quantitatively produce pentaborane(9).

The base, and equilibrium mixtures of base, triborane(7) adduct and borane adduct, have been found to be effective catalysts to increase the yield of pentaborane(9) over a wide range of concentration. It is generally preferred to use between .02 and .50 mole of catalyst for each mole of diborane. With less than about .02 mole of catalyst (per mole of diborane) the reaction is not significantly improved over uncatalyzed pyrolysis reactions. The yield of pentaborane increases with increasing amount of catalyst; however, there is only a slight advantage realized by increasing the amount of catalyst over 0.5 mole per mole of diborane. This is illustrated by the results set forth in Tables 1, 2 and 3.

TABLE 1.—PYROLYSIS OF DIBORANE WITH $(CH_3)_3NBH_3$ CATALYST

[Reaction time 16 hours; temperature 80° C.; initial $B_2H_6$ pressure, 600 mm. Hg]

| Catalyst Concentration Moles Catalyst/mole $B_2H_6$ | Percent $B_2H_6$ [1] Converted | Percent Yield [2] of Pentaborane(9) |
|---|---|---|
| 0.25 | 15 | 46 |
| 0.50 | 19 | 57 |

See footnotes at end of Table 2.

TABLE 2.—PYROLYSIS OF DIBORANE WITH $(CH_3)_3NBH_3$ CATALYST

[Reaction time 16 hours; temperature 80° C.; initial $B_2H_6$ pressure, 1,200 mm. Hg]

| Catalyst Concentration Moles Catalyst/mole $B_2H_6$ | Percent $B_2H_6$ [1] Converted | Percent Yield [2] of Pentaborane(9) |
|---|---|---|
| 0 | 16.5 | 6.5 |
| 0.25 | 42.0 | 36 |
| 0.50 | 36.0 | 46 |
| 1.01 | 35.0 | 50 |

[1] Throughout the specification percent diborane converted means the actual diborane consumed by all reactions, i.e. the $B_2H_6$ charged minus the diborane recovered.
[2] Percent yield is the B recovered as $B_5H_9$/total B consumed by all reactions.

TABLE 3.—PYROLYSIS OF DIBORANE WITH $(CH_3)_3NBH_3$ CATALYST

[Reaction time 2½ hours; temperature 100° C.; initial $B_2H_6$ pressure 750 p.s.i.g.]

| Catalyst Concentration Moles Catalyst/mole $B_2H_6$ | Percent $B_2H_6$ Converted | Percent Yield of Pentaborane (9) |
|---|---|---|
| 0.037 | 56 | 22 |
| 0.148 | 91 | 58 |
| 0.278 | 92 | 64 |

In all the catalyzed pyrolysis reactions the base was charged to the closed reactor, the diborane was subsequently added, and the reactor was then brought to the desired temperature. After a suitable reaction period, the volatile products were separated by fractional distillation. When a strong base, such as trimethylamine, was used a portion of the diborane reacted immediately on contact to form the borane adduct. The borane adduct is considered as the catalyst when using a strong base as there is only a small amount of triborane(7) adduct in equilibrium when a large excess of diborane is present.

Those reaction conditions that affect the pyrolysis reaction, i.e. temperature, pressure and reaction time, also affect the yield of pentaborane(9) when the catalyst is used. The pentaborane(9) producing reaction via the triborane(7) adduct proceeds regularly so that the longer the reaction time the higher the yield. However, when the pyrolysis conditions are too severe (i.e. temperatures above about 100° C.) pentaborane(9) is apparently consumed by further undesirable pyrolysis reactions so that under such severe conditions moderate reaction times of about ½ to 2 hours are preferred. This is illustrated by the results set forth in Table 4.

TABLE 4.—PYROLYSIS OF DIBORANE WITH $(CH_3)_3NBH_3$ CATALYST

[Initial $B_2H_6$ pressure 360 mm.; temperature 125° C.; 0.3 moles catalyst/mole $B_2H_6$]

| Reaction Time (hours) | Percent $B_2H_6$ Converted | Percent Yield Pentaborane |
|---|---|---|
| 0.8 | 22.4 | 89 |
| 1.0 | 36.7 | 75 |
| 1.5 | 56.2 | 60 |
| 2.0 | 63.2 | 4 |

As reaction time is increased the amount of diborane converted increases; however, the yield of pentaborane(9) decreases. This phenomenon is characteristic of pyrolysis reactions, and would indicate that under such conditions a higher proportion of tetraborane is consumed by pyrolysis reactions than at more moderate conditions. The phenomenon also occurs when diborane under pressure is pyrolyzed if the temperature is sufficiently high. Thus when 55 mmoles of $B_2H_6$ at 750 p.s.i.g. was contact with 2 mmoles of $(CH_3)_3N$ at 100° C. for 2½ hours, 56% of the diborane was converted and the yield of pentaborane(9) was 22%. In a 20½ hour reaction under the same conditions 83% of the diborane was converted, but the yield of pentaborane(9) was only 7%. At more moderate temperature conditions, below about 100° C., the excessive loss of pentaborane(9) product by pyrolysis does not occur, and longer reactions result in increased conversion of diborane without decrease of pentaborane(9) yield, as is shown in Table 5.

TABLE 5.—PYROLYSIS OF DIBORANE WITH $(CH_3)_3NBH_3$ CATALYST

[Temperature 60° C.; initial $B_2H_6$ pressure 750 p.s.i.g.; 8 moles catalyst/54 moles $B_2H_6$]

| Reaction Time (hours) | Percent $B_2H_6$ Converted | Percent yield $B_5H_9$ |
|---|---|---|
| 18¼ | 45 | 60 |
| 65 | 81 | 66 |
| 96 | 87 | 60.4 |
| 123¼ | 92 | 64 |

The reaction to produce pentaborane(9) proceeds over a wide temperature range, about 40 to 160° C., and at all pressures, i.e. from several millimeters of mercury to several hundred atmospheres. The rate at which diborane is converted or consumed increases with increasing temperature, e.g. after 16 hours at 600 mm. $B_2H_6$ pressure the conversion is approximately 50% at 80° C., and is approximately 80% at 100° C.; and with increasing pressure, e.g. after 16 hours at 100° C. the conversion is about 60% at 360 mm. pressure, and is approximately 80% at 600 mm. pressure. It is generally preferred to operate at high pressures, above about 200 p.s.i.g., and at moderate temperatures from about 50 to 90° C. Under these conditions the rate of conversion is relatively fast and because of the moderate temperature the losses of pentaborane(9) product by pyrolysis reactions are slight. At low pressures (about atmospheric) in order to get a high rate of conversion it is preferred to operate at higher temperatures, from about 100 to 150° C., and as set forth above, relatively short reaction periods are required to prevent losses of pentaborane(9).

The pyrolysis reactions are catalyzed by other organic substituted hydrides of elements from group V–A and VI–A at suitable conditions in the same manner as described above for the very strong base, trimethylamine. For example, when 50 mmoles of diborane, at 500 p.s.i.g. and 16.0 mmoles of ethyl ether, a weak base, were contacted at 40° C. for 88 hours, 36% of the diborane was consumed. The yield of pentaborane (9) was 63.6% and 15.6% yield of tetraborane was also recovered. Similarly, when 16 mmoles of ethyl ether and 51 mmoles of diborane were contacted at 40° C. for 65 hours, 50% of the diborane was consumed and the yield of pentaborane (9) was 71%. Similarly when 2.53 mmoles of $B_2H_6$, at 400 mm. pressure, and 6.7 mmoles of tripropylamine, were contacted for 1.5 hours at 125° C., the conversion of diborane was 33% and the yield of pentaborane (9) was 28%.

The pyrolysis of diborane in the presence of the base catalyst is particularly suited to continuous operation. Diborane under pressure is continuously fed to a reactor containing the catalyst, which may be a packed bed for solid catalyst such as trimethylamine borane, or a liquid contacting column for a liquid catalyst such as ethyl ether or phenyl ether. The products are continuously removed and separated from the unreacted diborane by fractional condensation, and the unreacted diborane is returned for further reaction.

The triborane (7) adducts are valuable compounds for use as reducing agents and preparing metal triborohydrides as well as for the preparation of pentaborane (9) and it is therefore desirable to be able to carry out the reactions of tetraborane and the base so that the triborane (7) adduct can be recovered in good yields. From the previous description of the role of the triborane (7) adduct in the preparation of pentaborane (9) it is apparent that the reactions of tetraborane that produce the adduct must be promoted and the reaction of tetraborane with the adduct must be retarded.

When using strong bases, such as cyclic ethers, or very strong bases, such as lower alkyl amines or phosphines, or cyclic amines or phosphines, quantitative yields of the triborane (7) adduct are easily obtained as the reaction, producing the adduct is extremely fast and the reaction consuming the adduct is very slow. Thus when 6.48 mmoles of tetrahydrofuran (a strong base) and 6.58 mmoles of tetraborane were frozen into a reaction bulb and permitted to warm, an immediate vigorous reaction occurred yielding diborane and a liquid product. The liquid product was a mixture of absorbed diborane and tetrahydrofuran triborane (7). The absorbed diborane was removed by vacuum desorption at room temperature leaving a white solid which analyzed as tetrahydrofuran triborane (7). The compound melts at 39° C., and has a decomposition pressure at room temperature of less than 1 mm. of Hg. At temperatures above the melting point the compound is relatively unstable. As the reaction is rapid and essentially quantitative there is no necessity to use an excess of either reactant; however, if desired an excess of either reactant can be used if the excess reactant is promptly removed from the triborane (7) product. When a large molar excess of tetraborane, e.g. 600%, is used the initial reaction to form tetrahydrofuran triborane (7) proceeds in the same manner as when stoichiometric amounts are used, and the excess tetraborane can be distilled from the mixture if it is removed before about 15–30 minutes after contact. If the excess tetraborane is allowed to remain in the reaction mixture for extended periods (several hours) it is partially consumed by pentaborane (9) producing reaction according to Equation 2..

Similarly the initial triborane (7) forming reaction of tetraborane with a very strong base is extremely rapid and goes to completion so that it is preferred to use stoichiometric amounts of reactants according to

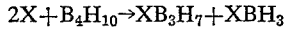
$$2X + B_4H_{10} \rightarrow XB_3H_7 + XBH_3$$

For example, 2.00 mmoles of tetraborane and 4.00 mmoles of trimethylamine were frozen into a reaction bulb, and then permitted to warm. As the reactants melted there was an immediate vigorous reaction which produced a mixture of crystals of trimethylamine triborane (7) and trimethylamine borane. The triborane (7) adducts can be separated from the borane adducts by a variety of methods. A convenient rapid method is to destroy the borane adduct by hydrolysis with a dilute acid which does not react with the triborane (7) adduct. For example, a portion of the above prepared mixture of trimethylamine triborane (7) and trimethylamine borane was contacted with a dilute solution of hydrochloric acid at room temperature. The borane adduct was readily hydrolyzed and the trimethylamine triborane (7) did not dissolve or appear to react. The solution was filtered off and the residue was washed with water and dried by vacuum treatment at about 30° C. The dried residue was trimethylamine triborane (7) of 98% purity. The triborane (7) adducts have also been separated from mixtures in good yields by fractional sublimation under vacuum at about 60–80° C. and by fractional crystallization from methanol or isopropanol solutions. The theoretical content of trimethylamine triborane (7) is: B, 30.4 mats./g.; nitrogen, 10.1 mats./g.; C, 30.4 mats./g.; hydrogen by hydrolysis, 81.3 mmoles/g.; and total hydrogen 163 mats./g. The actual elemental content of trimethylamine triborane (7) prepared by the above methods and recrystallized from methanol was found to be: B, 30.7 mats./g.; nitrogen, 10.0 mats./g.; carbon, 30.3 mats./g.; hydrogen by hydrolysis 79.5 mmoles/g.; and total hydrogen, 167 mats./g.

As was disclosed above, tetraborane reacts further with the borane adduct to form triborane (7) adduct, and reacts with the triborane (7) adduct to form pentaborane (9), giving an equilibrium mixture of the borane and triborane (7) adducts, which is rich in the triborane (7) adduct if the tetraborane concentration is high. As these reactions are very slow, excess tetraborane can be contacted with the very strong base, and the excess recovered by immediate separation (as by distillation) from the initial reaction products. The excess tetraborane can be left in contact with the initial reaction products for extended periods (20–40 hours) and the triborane (7) adduct rich mixture is recovered; under these conditions some tetraborane is consumed to produce pentaborane (9), which is a loss when the object is to prepare triborane (7) adduct. For example, when 1.75 mmoles of tetraborane and 1.00 mmoles of trimethylamine were contacted for 40 hours at room temperature the recovered adduct mixture was over 90% trimethylamine triborane (7) and about 20% of the tetraborane charged was consumed by the pentaborane (9) reaction.

Very strong bases appear to react slowly with triborane (7) adducts to give unidentified degradation products, so that if the very strong base is present in excess it should be removed immediately after the initial reaction.

The initial reaction of strong and very strong bases is rapid and proceeds satisfactorily at any temperature at which one of the reactants is fluid. It is preferred to carry out the secondary reaction of tetraborane with the borane adduct of a very strong base at about room temperature. At low temperatures, e.g. 0° C., the reaction is slow and at elevated temperatures, e.g. 50° C., the losses of tetraborane by thermal decomposition are large over the extended reaction periods required. The method of bringing the reactants into contact are not critical. It is convenient in small scale preparations to free both reactants in a reaction bulb and then permit the reactants to warm; the reaction then proceeds when the reactants become fluid. This procedure is cumbersome for larger scale preparation and for continuous processes, and in these cases it is preferred to mix the liquid reactants, mix a vapor and liquid reactant stream (above the boiling point of tetraborane, 16° C., gaseous tetraborane can be reacted with a liquid base and below the boiling point of tetraborane a gaseous base can be reacted with the liquid tetraborane), or mix two gaseous reactants (as with tetraborane and methylamine or methyl ether). It is possible to carry out the reaction in the presence of an inert liquid, such as a hydrocarbon, e.g. hexane. It is particularly preferred to use an inert liquid to moderate and aid in control of those reactions in which both reactants are gaseous. The inert diluent is also of particular use in those reactions which produce a solid triborane(7) compound, as it facilitates the handling of the solid product, i.e. as a slurry. The inert liquid can be filtered or centrifuged or evaporated from the triborane(7) coordination compounds.

The initial reaction with partially substituted hydrides of group V–A elements proceed in the same manner, but the borane adducts of such compounds are relatively less stable and may thermally decompose. For example, when monomethylamine and tetraborane are contacted at ambient temperatures they react according to $$CH_3NH_2 + B_4H_{10} \rightarrow CH_3NH_2B_3H_7 + CH_3NH_2BH_3$$

The borane, unstable at ambient temperature, decomposes according to $$CH_3NH_2BH_3 \rightarrow CH_3NHBH_2 + H_2$$

resulting in a product which is a mixture of methylamine triborane(7) and methylaminoborane. The triborane(7) compound can be separated from the aminoborane by the same type procedures as used for the separation from amine boranes.

Quantitative yields of triborane(7) adducts of weak bases are difficult to obtain because the rate at which the triborane(7) adduct is formed is in the same order of magnitude as the rate at which it is consumed by the pentaborane(9) reaction. Thus when 8.92 mmoles of tetraborane and 15.0 mmoles of ethyl ether were contacted at room temperature for 5 hours, 1.79 mmoles of tetraborane were consumed to yield .89 mmole of pentaborane and 1.39 mmoles of tetraborane were consumed to yield ethyl ether triborane(7) (about 10% concentration in ethyl ether). The excess ethyl ether and tetraborane were distilled from the reaction mixture under vacuum at room temperature leaving a liquid residue of ethyl ether triborane(7). Similarly, 2.28 mmoles of tri-n-propylamine was contacted with 2.49 mmoles of tetraborane at room temperature for 16 hours and 66% of the tetraborane was consumed in forming triborane(7) adduct and 7% was consumed to form pentaborane(9).

The complexes of this invention may be conveniently produced in a metathetic reaction from a complex formed from a coordinating compound of a weaker base strength than the desired complex. For example, trimethylamine triborane(7) has been produced by adding trimethylamine to tetrahydrofuran triborane dissolved in tetrahydrofuran or another suitable solvent having a base strength no greater than that of tetrahydrofuran. The tetrahydrofuran and solvent was removed by vacuum condensation leaving the pure solid, trimethylamine triborane(7). Ammonia triborane(7) has been produced by condensing a stoichiometric quantity of ammonia in an ethyl ether or tetrahydrofuran solution of tetrahydrofuran triborane(7). The liquid was removed under vacuum at room temperature and the white solid ammonia triborane(7) was recovered by sublimation under vacuum at 40° to 50° C. In like manner trimethyl phosphine triborane(7) has been prepared by the addition of trimethyl phosphine to tetrahydrofuran triborane(7) or ethyl ether triborane(7) dissolved in ethyl ether.

An alternate method of formation of complexes of ammonia or amines involves the reaction of ammonium halide or an organic substituted ammonium halide with sodium triborohydride, $NaB_3H_8$, according to the equation $$NH_4Cl + NaB_3H_8 \rightarrow NH_3B_3H_7 + NaCl + H_2$$

The reactants are agitated in ethyl ether because of the relatively low solubility of the reactants over a period of time at room temperature. The insoluble solids are then filtered off and the solvent removed from the filtrate depositing a white solid which was sublimed at 40 to 50° C.

The triborane(7) coordination compounds have been identified and characterized by a number of independent methods. The empirical composition is determined by elemental analyses. The hydrogen (termed hydrogen by hydrolysis) from the triborane(7) portion of the molecule is determined by hydrolysis according to the equation $$XB_3H_7 + 9H_2O \xrightarrow{HCl} 3H_3BO_3 + X + 8H_2$$

Since the compounds are quite resistant to hydrolysis, it is necessary to hydrolyze the sample in concentrated hydrochloric acid at about 100° C. for several days. The boron content is determined by the usual procedure of titrating the hydrolyzed sample in the presence of mannitol. The total carbon and hydrogen content is obtained by conventional microcombustion procedures. The group V–A and VI–A elements, except oxygen are determined by conventional procedures, e.g. nitrogen is determined by Kjeldahl analysis. Ethers were determined by separating, purifying and weighing the ether layers which form an immiscible phase with the solution of hydrolysis products. It should be noted that these procedures show certain facts about the chemical bonding in the compound as the hydrogen from the triborane(7) portion of the molecule is determined separately.

The molecular structure of the compounds have been verified by X-ray diffraction analysis. The unit cell of trimethylamine triborane(7) is rhombohedral with the parameters $a=6.04$ A. and $\alpha=104°14'$. The calculated density from these measurements assuming one molecule of trimethylamine triborane(7) in the unit cell is 0.838 g./cc., which is in excellent agreement with the observed density of 0.833 g./cc. This is evidence that empirical composition $(CH)_3NB_3H_7$ is the molecular formula. Other X-ray data are in agreement with the structure in which the three boron atoms form an equilateral triangle with two hydrogens bonded to each boron atom, the seventh hydrogen atom forms a four centered bond between the three boron atoms and in a plane below the boron triangle, the trimethylamine tetrahedral group is above the plane of the boron triangle with one bond involving the two electrons of the nitrogen atoms directed toward the center of the boron triangle. The other coordination compounds have likewise been shown to have a bond involving electrons of the group V–A or VI–A element directed toward the center of the $B_3H_7$ boron triangle.

The triborane(7) portion of the compound has a distinctive infra-red absorption spectra by which it can be distinguished from the borane adduct. Thus mixtures of triborane coordination compounds and borane adducts, as well as mixtures of triborane(7) adduct and base, can be readily analyzed by infra-red spectrum analysis.

The triborane(7) adducts with very strong bases are characterized by an extraordinary thermal stability and resistance to hydrolysis. For example, trimethylamine triborane(7), dimethylamine triborane(7) and monomethyl triborane(7) do not appear to thermally decompose to any significant extent at temperatures below at least 200° C.; and pyridine triborane(7), picoline triborane(7), and lutidine triborane(7) do not decompose at temperatures below about 300° C. In general the phosphine compounds are somewhat less stable than the corresponding amines, and the arsine compounds are less stable than the corresponding phosphine compounds. The triborane(7) adducts with strong bases are generally solids at lower temperatures melting about room temperature and are considerably less stable. They generally have a finite decomposition pressure at room temperature and decompose more rapidly above their melting point. The triborane(7) adducts with weak bases are liquids of low volatility and are less stable than the adducts with strong bases.

The triborane(7) coordination compounds are generally very soluble in polar solvents other than water and only moderatly soluble or insoluble in non-polar solvents. For example, trimethylamine triborane(7) and pyridine triborane(7) are very soluble in alcohols, e.g. methanol; very soluble in tetrahydrofuran; moderately soluble in ethyl ether; slightly soluble in benzene; insoluble in hydrocarbons, e.g. hexane; and insoluble in water.

The triborane(7) adducts are excellent reducing agents for both organic and inorganic compounds. Because of their stability in alcohol solution, they are particularly useful in carrying out organic reductions in alcohol solution or reductions which give an alcohol product, such as the reduction of acetone to isopropyl alcohol and benzaldehyde to benzyl alcohol. When a methanol solution of pyridine triborane(7) was contacted with acetone at room temperature there was a rapid reaction producing isopropanol. The use of triborane(7) coordination compounds is particularly advantageous as no metallic element is introduced during the reduction processes as is the case with metal borohydrides or metal triborohydrides. The triborane(7) adducts with very strong bases are preferred for use as reducing agents as they are extremely stable and resistant to hydrolysis and hence are easily packaged, stored, and transported.

The triborane adducts of strong to very weak bases are particularly useful in preparing alkali metal triborohydrides according to the equation $$MH + XB_3H_7 \rightarrow MB_3H_8 + X$$

where M is an alkali metal. This reaction proceeds readily at room temperature, and if a solid triborane adduct is used it is preferred to carry out the reaction in a solvent. For example, a mixture of 11 mmoles ethyl ether triborane(7) and 80 mmoles of ethyl ether was contacted in a closed reaction vessel with 10.8 mmoles solid NaH until a clear solution resulted in about 2 hours. Ethyl ether was distilled from the reaction mixture leaving a solid residue of $NaB_3H_8$. The methods of preparing triborohydrides from triborane(7) coordination compounds are set forth in detail in our co-pending application, Ser. No. 672,574, filed on July 18, 1957, which is a continuation-in-part application of Ser. No. 572,205, filed Mar. 19, 1956, and which has issued as U.S. Patent No. 3,171,712.

According to the provisions of the patent statutes, we have explained the principle of our invention and have described what we now consider to be its best embodiment. However, we desire to have it understood that, within the scope of the appended claims, the invention may be practiced otherwise than as specifically described.

We claim:
1. That method of preparing pentaborane(9) comprising the step of contacting tetraborane with a substance of the group consisting of basic organic substituted hydrides of an element selected from group V–A and basic completely organic substituted hydrides of an element selected from group VI–A, triborane(7) adducts with said hydrides, borane adducts with said hydrides and mixtures theretof, at a temperature between 0° and 60° C., and recovering the pentaborane(9) formed.
2. A method according to claim 1 in which the substance is an ether.
3. A method according to claim 2 in which the ether is ethyl ether.
4. A method according to claim 2 in which the ether is a cyclic ether and more than 1 mole of tetraborane is used for each mole of ether.
5. A method according to claim 4 in which the cyclic ether is tetrahydrofuran.
6. A method according to claim 1 in which the substance is an amine.
7. A method according to claim 6 in which the amine is a lower alkyl amine and more than ½ mole of tetraborane is used for each mole of amine.
8. A method according to claim 7 in which the lower alkyl amine is trimethylamine.
9. A method according to claim 6 in which the substance is a cyclic amine and more than ½ mole of tetraborane is used for each mole of amine.
10. A method according to claim 9 in which the cyclic amine is pyridine.
11. A method according to claim 1 in which the substance is an ether triborane(7) adduct.
12. A method according to claim 11 in which the ether is a lower dialkyl ether.
13. A method according to claim 11 in which the ether is a cyclic ether.
14. A method according to claim 13 in which the cyclic ether is tetrahydrofuran.
15. A method according to claim 1 in which the substance is an amine triborane(7) adduct.
16. A method according to claim 15 in which the amine is a lower alkyl amine.
17. A method according to claim 16 in which the amine is trimethylamine.
18. A method according to claim 15 in which the amine is a cyclic amine.
19. A method according to claim 18 in which the cyclic amine is pyridine.
20. A method according to claim 1 in which the substance is a mixture of an ether and an ether triborane(7) adduct.
21. A method according to claim 20 in which the ether is ethyl ether and the triborane(7) adduct is ethyl ether triborane(7).
22. A method according to claim 1 in which the catalyst is a mixture of an amine triborane(7) and an amine borane.
23. A method according to claim 22 in which the amine triborane(7) adduct is trimethylene triborane(7) and the borane adduct is trimethylamineborane.
24. That method of preparing pentaborane(9) comprising the step of contacting diborane with a catalyst selected from the group consisting of basic organic substituted hydrides of an element selected from group V–A and basic completely organic substituted hydrides of an element selected from group VI–A, a triborane(7) adduct with said organic substituetd hydride, a borane adduct with said organic substituted hydride, and mixtures thereof, at a temperature between 40° and 150° C. and recovering the pentaborane(9) formed.
25. A method according to claim 24 in which the catalyst concentration is between 2 and 50 mole percent.
26. A method according to claim 25 in which the diborane pressure is in excess of 200 p.s.i.g.
27. A method according to claim 26 in which the temperature is between 60° and 90° C.
28. A method according to claim 24 in which the pressure 300 and 122 mm. of mercury and the temperature is between 100° and 150° C.
29. A method according to claim 24 in which the catalyst is a mixture of an amine borane and an amine triborane(7).
30. A method according to claim 24 in which the catalyst is a mixture of an ether and an ether triborane(7).
31. That method of preparing pentaborane(9) comprising the step of contacting diborane with a mixture of trimethylamine borane and trimethylamine triborane(7) between 60° and 90° C. at a pressure in excess of 200 p.s.i.g. and recovering the pentaborane(9) formed.
32. That method of preparing pentaborane(9) comprising the step of contacting diborane with ethyl ether betwen 60° and 90° C. and at a pressure in excess of 200 p.s.i.g., and recovering the pentaborane(9) formed.

No references cited.

EARL C. THOMAS, Primary Examiner

G. PETERS, Assistant Examiner